United States Patent [19]

Moore et al.

[11] 4,086,323
[45] Apr. 25, 1978

[54] PROCESS FOR REMOVAL OF SULFUR COMPOUNDS FROM FUEL GASES

[75] Inventors: Raymond H. Moore; Gary E. Stegen, both of Richland, Wash.

[73] Assignee: The United States of America as represented by the United States Department of Energy, Washington, D.C.

[21] Appl. No.: 808,488

[22] Filed: Jun. 21, 1977

[51] Int. Cl.$^2$ ............................................. B01D 53/34
[52] U.S. Cl. ................................ 423/210.5; 423/232; 423/563
[58] Field of Search ..................... 423/210, 210.5, 232, 423/563; 48/206, 215

[56] References Cited

U.S. PATENT DOCUMENTS

| | | | |
|---|---|---|---|
| 3,671,185 | 6/1972 | Lefrancois et al. | 423/210.5 |
| 3,919,390 | 11/1975 | Moore | 423/210.5 |
| 3,996,335 | 12/1976 | Wolk et al. | 423/210.5 |

*Primary Examiner*—Earl C. Thomas

*Attorney, Agent, or Firm*—Dean E. Carlson; Frank H. Jackson; Hugh Glenn

[57] ABSTRACT

Fuel gases such as those produced in the gasification of coal are stripped of sulfur compounds and particulate matter by contact with molten metal salt. The fuel gas and salt are intimately mixed by passage through a venturi or other constriction in which the fuel gas entrains the molten salt as dispersed droplets to a gas-liquid separator. The separated molten salt is divided into a major and a minor flow portion with the minor flow portion passing on to a regenerator in which it is contacted with steam and carbon dioxide as strip gas to remove sulfur compounds. The strip gas is further processed to recover sulfur. The depleted, minor flow portion of salt is passed again into contact with the fuel gas for further sulfur removal from the gas. The sulfur depleted, fuel gas then flows through a solid absorbent for removal of salt droplets. The minor flow portion of the molten salt is then recombined with the major flow portion for feed to the venturi.

10 Claims, 1 Drawing Figure

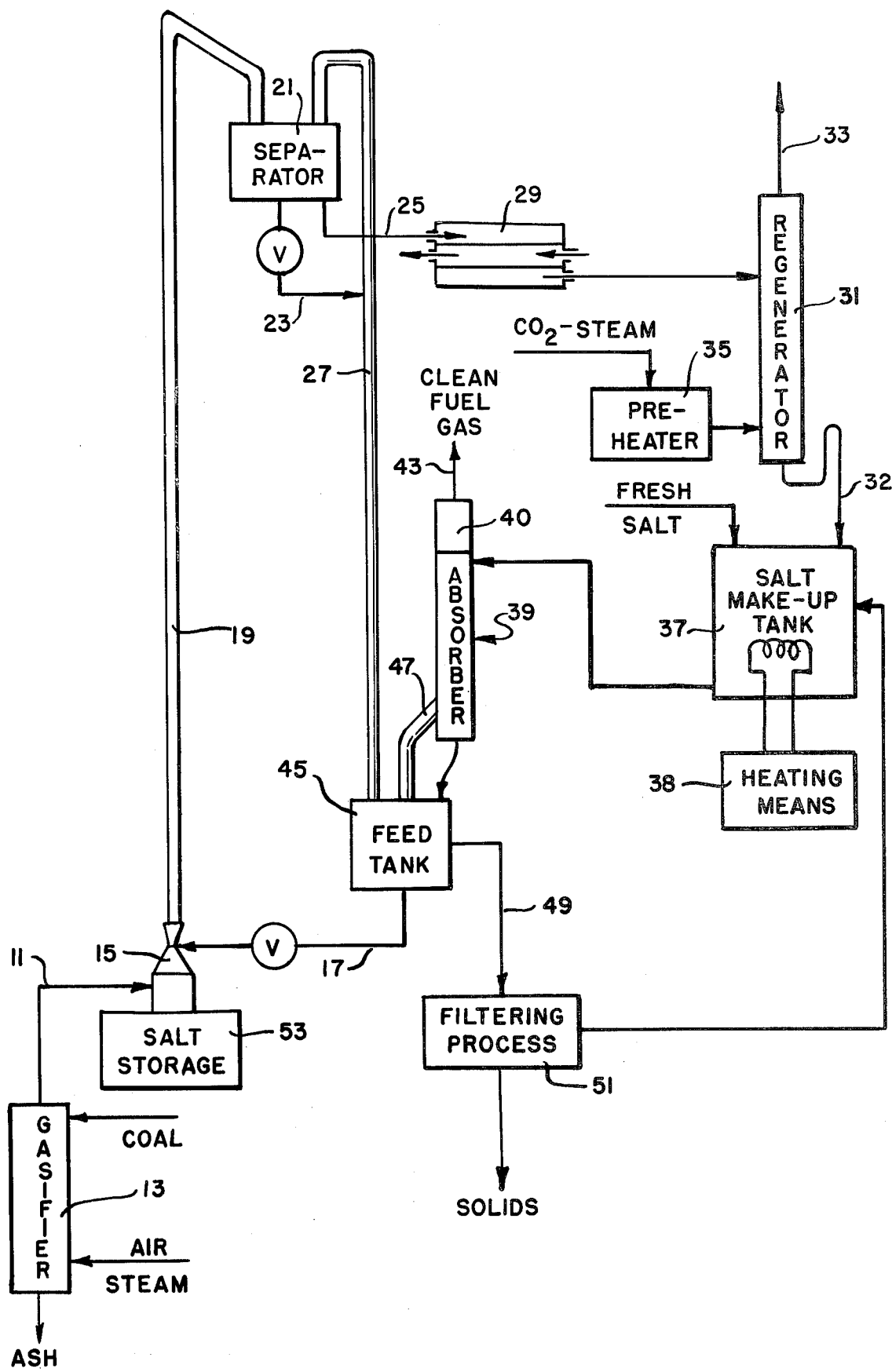

PROCESS FOR REMOVAL OF SULFUR COMPOUNDS FROM FUEL GASES

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a method for cleaning fuel gases such as those produced in the gasification of coal or in petroleum and natural gas refining processes. It may also have application in other chemical fields in which sulfur compounds or particulate material are to be removed from carbonaceous gas streams.

This process has particular application for cleaning fuel gases produced in the gasification of coal. Such gases contain particulate materials such as ash components of the coal and finely divided char particles in suspension. The gas also includes hydrogen sulfide derived from pyrite or other forms of sulfur in the coal. Other sulfur compounds, such as carbonyl sulfide and various organic sulfur compounds, also may be released on gasification.

Molten salts are advantageously used for cleaning fuel gases at temperatures near those at which the gases emerge from the gasifier to conserve sensible heat. The alkali metal and alkaline earth metal carbonates are well suited for this purpose as they react with hydrogen sulfide to form metal sulfide and thereby remove sulfur from the fuel gas. The metal sulfides in the salts can be regenerated to carbonates through reaction with a strip gas such as steam and carbon dioxide.

Various carbonate salt compositions can be used. The ternary eutectic mixture of, by mole proportion, 43.5% lithium carbonate, 31.5% sodium carbonate and 25% potassium carbonate is advantageous in that it has a low melting temperature of about 395° C. Calcium carbonate can be dissolved up to about 20% in this eutectic or substituted for a portion of the lithium carbonate with some increase in melting point. Typical salt compositions including in mole proportion, 15 to 40% lithium carbonate, 25 to 40% sodium carbonate, 25 to 35% potassium carbonate, and 10 to 20% calcium carbonate have been suggested. Molten salt compositions in these ranges are not so volatile as to contribute significant impurities to the clean fuel gas. Such salts also tend to catalyze the hydrogen reduction of carbonyl sulfide to hydrogen sulfide but are otherwise fairly inert to fuel gas constituents.

A process for use of such a salt composition is presented in U.S. Pat. No. 3,919,390 to one of the present inventors and assigned to the United States Government. Other processes that include the use of molten salts for cleaning fuel gases are illustrated in U.S. Pat. No. 3,671,185 and U.S. Pat. No. 3,438,722.

U.S. Pat. No. 3,919,390 also discloses the use of a venturi scrubber for contacting fuel gas with molten salt. The venturi scrubber is a concurrent flow contactor. It provides about a single equilibrium extraction stage which is generally adequate for more than 90% removal of sulfur compounds. This removal efficiency can be achieved provided the salt is not loaded too heavily with the metal sulfides. However, the inventors have found that if the molten salt is maintained at a sufficiently low metal sulfide level for good removal of the sulfur compounds from the fuel gas, the concentration of hydrogen sulfide in the strip gas used to regenerate the salt also will be low. Low hydrogen sulfide concentrations, e.g. less than about 10% by volume in the discharge strip gas from the regenerator, are undesirable for efficient operation of a Claus process for the recovery of sulfur.

The use of multiple stages to obtain the desired concentrations of sulfur compounds will ordinarily require pumping devices for process fluid transfer. Unfortunately, molten salt mixtures of the type suggested are quite corrosive. Consequently the use of conventional rotary and reciprocating pumps with moving parts can cause process problems due to pump failure.

Therefore, in view of these disadvantages of the prior art systems, it is an object of the present invention to provide an improved process employing a molten, metal-carbonate salt for the removal of sulfur compounds and particulates from a fuel gas.

It is a further object to provide a process in which the hydrogen sulfide stripped from the fuel gas can be discharged at a sufficiently high concentration for use as an effective feed to a sulfur recovery process while still removing most of the sulfur from the fuel gas.

It is also an object to provide such a process with minimal use of mechanical pumping devices having moving parts for conveying the molten salt within the process.

SUMMARY OF THE INVENTION

In accordance with the present invention a process for removing hydrogen sulfide from a fuel gas stream is provided. The fuel gas contacts a dispersion of molten, metal-carbonate salt which reacts with the hydrogen sulfide to produce metal sulfide within the salt. The salt is subsequently regenerated with carbon dioxide and steam to provide a strip gas flow for feeding a sulfur-recovery system. The improvement in this hydrogen-sulfide removal process involves separating the molten salt mixture from the gas flow in which it is entrained and dividing the salt mixture into a major and a minor flow portion. The minor flow portion of molten salt is passed into contact with the flow of steam and carbon dioxide gas to regenerate metal sulfides within the molten salt to the corresponding metal carbonates and thereby release hydrogen sulfide into the strip gas flow. The molten salt depleted in metal sulfide then is passed again into contact with the fuel gas stream for further removal of hydrogen sulfide from the fuel gas. To complete the cycle, the minor flow portion is recombined with the major flow portion of molten salt to be dispersed as droplets into contact with the entering flow of the fuel gas stream.

BRIEF DESCRIPTION OF THE DRAWING

The drawing is a schematic flow diagram illustrating a process for the removal of sulfur compounds and particulate material from a fuel gas stream.

DETAILED DESCRIPTION OF THE PREFERRED EMBODIMENT

In the process illustrated in the FIGURE, a carbonaceous fuel-gas stream 11 from a coal gasifier 13 is shown fed to the inlet of a venturi 15. A flow of molten salt 17 is drawn into the throat of the venturi where it is dispersed as droplets within the gas flow. The gas flow entrains the molten salt liquid through a vertical line 19 into a vapor liquid separator 21.

As a result of the contact between the molten salt droplets and the fuel gas within venturi 15 and vertical line 19, ash and other solid particles from the gasifier are taken up by the molten salt. In addition, the sulfur compounds, e.g. hydrogen sulfide and carbonyl sulfide within the fuel gas are absorbed into the molten salt primarily by reaction with metal carbonates to form metal sulfides.

The use of the vertically oriented venturi 15 directed into the vertical line 19 allows the fuel-gas momentum, increased by the venturi contraction, to transfer to the molten salt droplets and elevate them to the raised separator 21. This arrangement advantageously permits gravity flow to subsequent process steps, and eliminates or minimizes the use of mechanical pumps that may be severely corroded by the molten salt composition.

The molten salt gravitating from the vapor liquid separator 21 is divided into a major flow portion 23 and a minor flow portion 25. The major flow portion 23 can again cocurrently contact the fuel gas flow in line 27 as they pass together. Any portion of the entrained molten salt that is not removed in separator 21 will form a part of the major flow portion in cocurrent contacting line 27.

The minor flow portion of molten salt 25 flows through a cooler 29 where its temperature is reduced prior to entering the regenerator 31. The minor flow portion is typically cooled from about 700° – 800° C. to a temperature of about 500° – 600° C. depending on the melting temperature of the salt used. For the eutectic mixture mentioned above, the substituted metal sulfides and the ash constituents dissolved in the salt may act to raise the freezing point of the mixture such that temperatures below 500° C. may involve the risk of freeze plugging. Also if the coolant (e.g. carbon dioxide, steam or air) used in cooler 29 is at a substantially lower temperature than the molten salt, preheating or recycling may be required to prevent complete solidification of the salt.

In the regenerator 31 the minor flow portion of molten salt is contacted with a countercurrent flow of steam and carbon dioxide gas. These stripper gases react with the metal sulfides, e.g. sodium sulfide or calcium sulfide to produce hydrogen sulfide gas and regenerate the salt to the metal carbonate. The following reaction typically occurs:

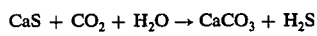

$$CaS + CO_2 + H_2O \rightarrow CaCO_3 + H_2S$$

The other metal sulfides are also regenerated in similar reactions. Gas stream 33 leaving the regenerator 31 will include unreacted steam and carbon dioxide along with a sufficiently high concentration of hydrogen sulfide to make up the feed to a Claus process for the production of sulfur.

The carbon dioxide and steam shown entering regenerator 31 is illustrated passing through preheater 35. This preheater can be consolidated with cooler 29 to employ the steam and carbon dioxide to cool the minor flow portion of molten salt 25.

The molten salt stream 32 leaving regenerator 31 is shown entering a salt makeup tank 37 where additional salt is added as required. The added salt replenishes process losses and can also include the return of salt bled from the process for filtering. Tank 37 can be provided with heating means 38 for melting the solid salt and for increasing the molten salt temperature for feeding into the absorber 39.

The minor flow portion of molten salt enters the absorber column 39 where it contacts the fuel-gas flow countercurrently. Here the hydrogen sulfide remaining in the fuel gas reacts with metal carbonates to form metal sulfide within the molten salt. Since this is an endothermic reaction, the molten salt is provided at an increased temperature, e.g. about 700°–800° C. The clean gas flow 43 leaving absorber 39 can be passed into contact with a solid adsorbent to remove molten salt droplets. Solid absorbents such as silica or alumina can be included in the upper portion 40 of absorber column 39 or in a separate vessel for this purpose.

Molten salt leaving absorber 39 passes into venturi feed tank 45 where it is recombined with the major flow portion of molten salt entering through line 27. The head space in feed tank 45 serves to separate the fuel gas flow from the the molten salt. The fuel gas is withdrawn from an outlet in the top portion of tank 45 into line 47 which feeds the fuel gas into the absorber 39.

In order to remove particulate matter such as ash particles from the molten salt, a part of the salt is bled at intervals from a suitable point in the process such as at line 49. The bled portion of salt can be fed to a filtering process 51 in which it is dissolved in water and filtered. The mixed metal carbonates can be recrystallized by evaporation of the water and the clean solid salt returned to the makeup tank 37. Heating means 38 can be employed to remelt the filtered salt as well as any fresh salt added into tank 37.

Venturi feed tank 45 is preferably positioned slightly above or on a level with the venturi 15. The molten salt within tank 45 can then be made to flow by gravity and by the venturi suction through line 17 into the venturi throat where it is atomized again into salt droplets by the entering fuel-gas flow. An emergency storage tank 53 is provided below the venturi for dumping the hot molten salt should a line rupture or other emergency occur.

In most instances, the various components employed within the process of the present invention are of well known construction. The venturi 15 is illustrated as a tapered, tubular device having a tapered inlet and tapered outlet separated by a constriction at its throat. The molten salt is fed into an inlet at that constriction where it can be dispersed and entrained into the expanding gas flow as a fine mist. Other implements such as an orifice or a nozzle might also be employed for dispersion of the liquid into the gas at this point. However, abrupt changes in flow channel diameter may result in unacceptably large pressure drops.

Vapor liquid separator 21 can be a large open vessel to reduce gas velocity and thereby permit the molten salt droplets to coalesce. It can include baffles for directing flow or can comprise a cylindrical or cone-shaped tank with tangential entry for providing a vortex flow with centrifugal separation of the molten salt droplets from the gas. The venturi feed tank 45 may also contain baffles or such other features as needed to separate the fuel gas flow from the major flow portion of the molten salt.

The regenerator and absorber designs 31 and 39 can be typical vapor or gas-liquid type contactors. Such contactors include bubble-cap tray columns, columns with sieve trays, packed columns, spray towers, baffle plate columns and venturi scrubbers. These units are selected and designed in accordance with accepted chemical engineering principles and practice.

The various other components employed in the process can be provided from well known chemical processing equipment.

EXAMPLE I

A flow of about 75 standard cubic feet per minute of fuel gas at about 750° C. from a coal gasification process containing about 1.3% by volume $H_2S$ within $H_2$, CO, $N_2$, $CO_2$, and $H_2O$. The gas passes through a venturi scrubber where it is contacted with about 3–4 liters per minute of a molten salt of $Li_2CO_3$ -$Na_2CO_3$ -$K_2CO_3$ eutectic. The salt is dispersed within the gas flow as the liquid-gas mixture flows upwardly through a vertical tube of about 8–10 meters length into a vapor-liquid separator. The separated molten salt is divided into a major portion of about six-sevenths of the total which flows concurrently with the gas stream into a feed tank for the venturi. The minor portion comprising about one-seventh of the salt flow is cooled from about 700° C. to about 550° C. and contacted in a regenerator column having eight trays with a countercurrent flow of carbon dioxide and steam. The sulfur content of the salt is reduced from about 0.14 mole fraction to about 0.01 mole fraction, while the stripper gas is enriched in hydrogen sulfide to about 12% by volume. This gas is further enriched on leaving the regenerator to about 30% $H_2S$ by condensation of the steam. The molten salt flow then feeds a bubble cap column containing two trays where it again contacts the complete fuel gas flow at a temperature of about 700° C. In this operation the concentration of hydrogen sulfide in the fuel gas is reduced to less than 0.05% by volume. The minor flow portion of salt is then recombined with the major flow portion to comprise the salt feed into the venturi scrubber. The process results in about 96% by volume removal of hydrogen sulfide from the fuel gas. Further data based on equilibrium conditions consistent with Example I are given in Tables I and II respecting the gas and molten salt flow rates.

TABLE I

| | Gas Flow Rate, lb-moles/hour | | | |
|---|---|---|---|---|
| Stream | Flow Rate $H_2$ + CO + $N_2$ | $CO_2$ | $H_2S$ | $H_2O$ |
| Gas to venturi | 10.5 | 0.63 | 0.164 | 1.25 |
| Gas from venturi | 10.5 | 0.75 | 0.046 | 1.37 |
| Gas from vapor-liquid Separator | 10.5 | 0.75 | 0.046 | 1.37 |
| Gas to regenerator | — | 0.49 | — | 0.98 |
| Gas from regenerator | — | 0.332 | 0.158 | 0.822 |
| Product gas | 10.5 | 0.79 | 0.006 | 1.41 |

TABLE II

| | Salt Flow Rate, lb-moles/hours | |
|---|---|---|
| Stream | Salt | Salt Phase Sulfur |
| Salt from venturi | 8.56 | 1.167 |
| Major flow portion of salt | 7.32 | 0.998 |
| Minor flow portion of salt | 1.24 | 0.169 |
| Salt leaving regenerator | 1.24 | 0.011 |
| Salt feed to absorber | 1.24 | 0.011 |
| Salt leaving absorber | 1.24 | 0.052 |
| Salt to venturi | 8.56 | 1.05 |

EXAMPLE II

The hydrogen sulfide removal process is operated in much the same manner as described in Example I except that the gas feed is reduced to about 50 standard cubic feet per minute and the minor flow portion of molten salt feeding the absorber in countercurrent contact with the gas flow is heated to about 800° C. The major to minor flow portions of molten salt are at a ratio of about 12 to 1 by volume. Between 95 and 99% removal of the sulfur from the fuel gas is obtained.

The above examples are presented merely to illustrate the process of the present invention. It can be seen from these examples that this novel process permits the nearly complete removal of hydrogen sulfide from a fuel gas while maintaining the discharged hydrogen sulfide at a high concentration level for feeding a process for the production of sulfur. Furthermore, the pumping of the highly corrosive salt streams by mechanical pumps having moving parts is minimized if not completely eliminated. This is accomplished by entraining the salt as droplets from a venturi to an elevated height, then using gravity for feeding subsequent process steps. The molten salt is divided into a major and a minor salt flow with only the minor flow passing to the necessary additional mass transfer operations. It is also seen that this process permits the removal of particulate matter from a fuel gas through contact with a molten salt but without having to deal with the entire molten salt flow during sulfur removal from the molten salt.

The embodiments of the invention in which an exclusive property or privilege is claimed are defined as follows:

1. In a continuous process for extracting hydrogen sulfide from a fuel-gas stream wherein the gas stream is contacted with a flow of molten, metal-carbonate salt mixture to form metal sulfide and the salt mixture is subsequently regenerated to lower its metal sulfide concentration by contact with carbon dioxide and steam, the improvement following said fuel-gas and molten salt contact comprising:

separating said salt mixture from said fuel-gas stream and dividing said salt mixture into a major flow portion and a minor flow portion, each flow portion having a first concentration of metal sulfide;

regenerating said minor flow portion of salt by contacting it with a gas flow of steam and carbon dioxide to enrich the gas flow in hydrogen sulfide and to deplete the minor flow portion of molten salt to a second concentration that is less than said first concentration of metal sulfide;

contacting said fuel-gas stream with said minor flow portion of molten salt at said second concentration of metal sulfide to further absorb hydrogen sulfide from said fuel gas stream; and recombining said minor flow portion with said major flow portion of molten salt for contacting said fuel-gas stream with the combined flow of molten salt.

2. The process of claim 1 wherein said molten salt contacts said fuel-gas stream in a vertically oriented venturi to entrain said molten salt as droplets to a vessel above said venturi for said separation step.

3. The process of claim 1 wherein said minor flow portion of molten salt is cooled to a reduced temperature in respect to said major flow portion of molten salt before regenerating said minor flow portion by contact with said carbon dioxide and steam.

4. The process of claim 1 wherein said fuel-gas stream is originally contacted with both said minor and major flow portions at a temperature of about 700° – 800° C.

and said minor flow portion of molten salt is cooled to a temperature of about 500° – 600° C. prior to said regeneration.

5. The process of claim 1 wherein a part of the molten salt flow is diverted through filtering means for removing particulate matter.

6. The process of claim 1 wherein there is included means for introducing fresh metal carbonate salt into said minor flow portion prior to contacting said fuel-gas steam for further absorption of hydrogen sulfide.

7. The process of claim 1 wherein said fuel-gas stream depleted in hydrogen sulfide is contacted with a solid adsorbent for removing molten salt droplets.

8. The process of claim 1 wherein said first concentration of metal sulfide within said major and minor portions of molten salt flow is at about 0.14 mole fraction and said second concentration of metal sulfide within said minor portion of molten salt flow leaving the regeneration step is less than about 0.01 mole fraction.

9. The process of claim 1 wherein the concentration of hydrogen sulfide within the gas flow leaving the regeneration step is more than 10% by volume in carbon dioxide and steam.

10. The process of claim 1 wherein the ratio of major to minor portions of salt flow is about 12 to 1 to 6 to 1.

* * * * *